United States Patent [19]

Kasprow et al.

[11] Patent Number: 5,516,257
[45] Date of Patent: May 14, 1996

[54] AIRCRAFT FAN CONTAINMENT STRUCTURE RESTRAINT

[75] Inventors: Robert F. Kasprow, Wethersfield; Kurt M. Dembeck, Vernon; Grant Eckfeldt, Colchester, all of Conn.

[73] Assignee: United Technologies Corporation, Hartford, Conn.

[21] Appl. No.: 234,460

[22] Filed: Apr. 28, 1994

[51] Int. Cl.⁶ .............................. F01D 21/00; F01D 25/24
[52] U.S. Cl. ................................ 415/9; 415/200
[58] Field of Search ................... 415/9, 200, 173.1, 415/173.4, 173.5, 174.4

[56] References Cited

U.S. PATENT DOCUMENTS 4,452,563  6/1984  Belanger et al.
4,490,092  12/1984  Premont.
4,699,567  10/1987  Stewart .................................. 415/9
5,188,505  2/1993  Schilling et al. .......................... 415/9

*Primary Examiner*—Edward K. Look
*Assistant Examiner*—Christopher Verdier
*Attorney, Agent, or Firm*—Edward L. Kochey, Jr.

[57] ABSTRACT

Woven fiber ballistic fabric (22) of multiple layers surrounds an isogrid support structure (20). A cuff portion (38) has shorter warp threads than the major portion (3) and also is impregnated with epoxy resin. A diameter restrains the fabric from aft movement during a blade ejection event.

9 Claims, 2 Drawing Sheets

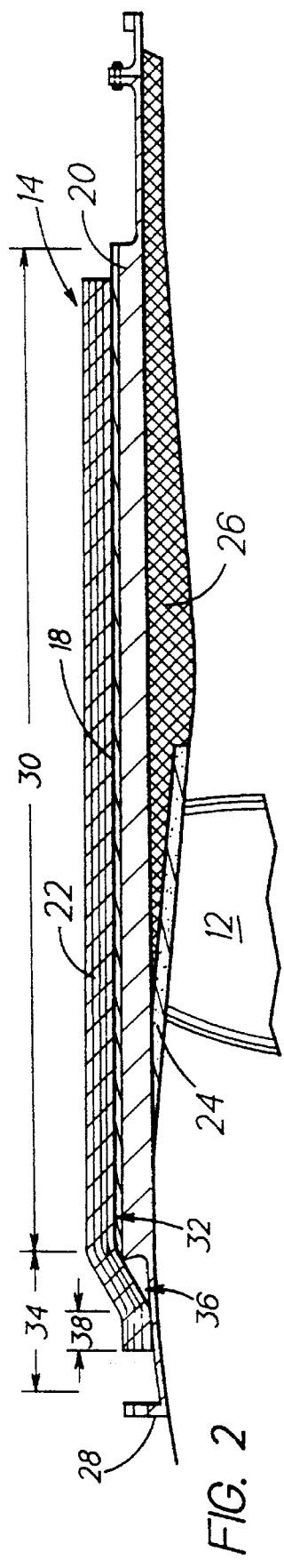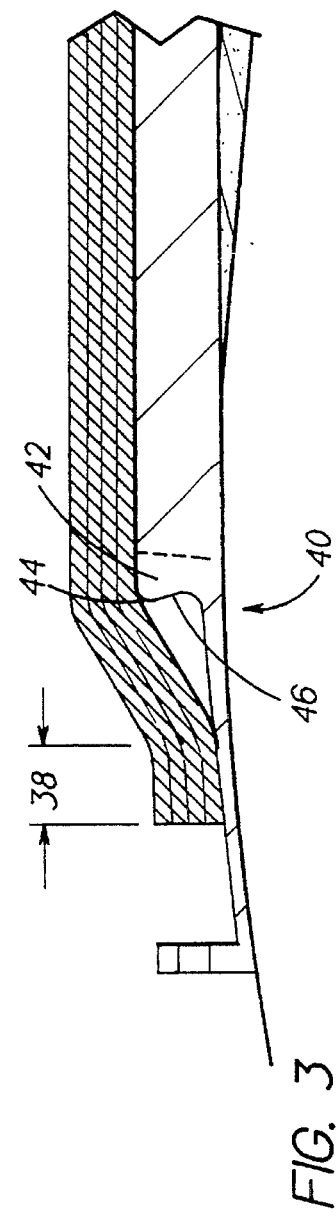

AIRCRAFT FAN CONTAINMENT STRUCTURE RESTRAINT

TECHNICAL FIELD

The invention relates to structures for containing fractured blades of a turbofan gas turbine engine, and in particular, for the restraint of the ballistic fabric thereof.

BACKGROUND OF THE INVENTION

Turbofan aircraft engines have large fans at the forward end. They rotate at a high speed at about 4000 revolution per minute.

Foreign objects such as birds, hailstones or debris ingested from the ground occasionally strike the fan blades. It is possible for this to cause the fan blades to fragment. These fragments may be on the order of 7 kilograms traveling at about 930 meters per second. It is essential to contain the blade fragments and also to retain the casing.

A typical containment structure is shown in U.S. Pat. No. 4,490,092 entitled "Containment Structure" and issued to Emile J. Premont. A support structure has "c" shaped stiffeners between inner and outer sheets. This structure surrounds the fan and has multiple layers of woven KEVLAR® ballistic fabric (trademark of DuPont Corporation). This fabric is wound under tension and serves to resiliently contain blade fragments passing through the support structure.

FIGS. 10 through 15 of the above-cited U.S. Pat. No. 4,490,092 illustrate the general track of a blade fragment passing through the support structure and retained by the ballistic fabric. The blade fragment has an aft component and moves in the aft direction pulling the ballistic fabric with it. The ballistic fabric is pulled downstream with the fabric from the forward location coveting the opening. The fabric on occasion is pulled into the hole by the rotor during this failure event. Interaction of the fabric with the blades causes additional damage.

This has been avoided in the past by making a large honeycomb structure positioning the cloth well away from the rotor. This however increases the diameter required. An alternate approach would be to use mechanical fasteners to keep the fabric in place, but this could lead to concentrated loading and tearing of the fabric.

SUMMARY OF THE INVENTION

The cylindrical case surrounding the fan blades has a large diameter containment portion throughout the major part of the length. It has a reduced diameter neck portion at the forward end of the case.

A multiple layer winding of ballistic fiber surrounds both the large containment portion and the smaller restraint portion. The fabric has warp yarns extending circumferentially of the case.

The warp yarns in the portion of the winding that surround the reduced diameter neck portion form a cuff by being shorter than the warp yarns in the portion of the winding surrounding the large diameter portion, when these yarns are at equal strain. This is established by specifying such weaving for the fabric to be used.

The portion of the fabric in the neck portion is saturated with a cured epoxy resin throughout the circumference, this being throughout all of the layers rather than just a surface coating.

The step between the large diameter and reduced diameter is preferably should be greater than 2% of the reduced diameter.

BRIEF DESCRIPTION OF THE DRAWINGS

FIG. 2 is a section through the casing showing the relationship of the casing and ballistic fabric to the fan blade; and FIG. 3 is a section of a forward end of an isogrid support structure showing the relationship of the ballistic fabric.

DESCRIPTION OF THE PREFERRED EMBODIMENT

Figure 1:
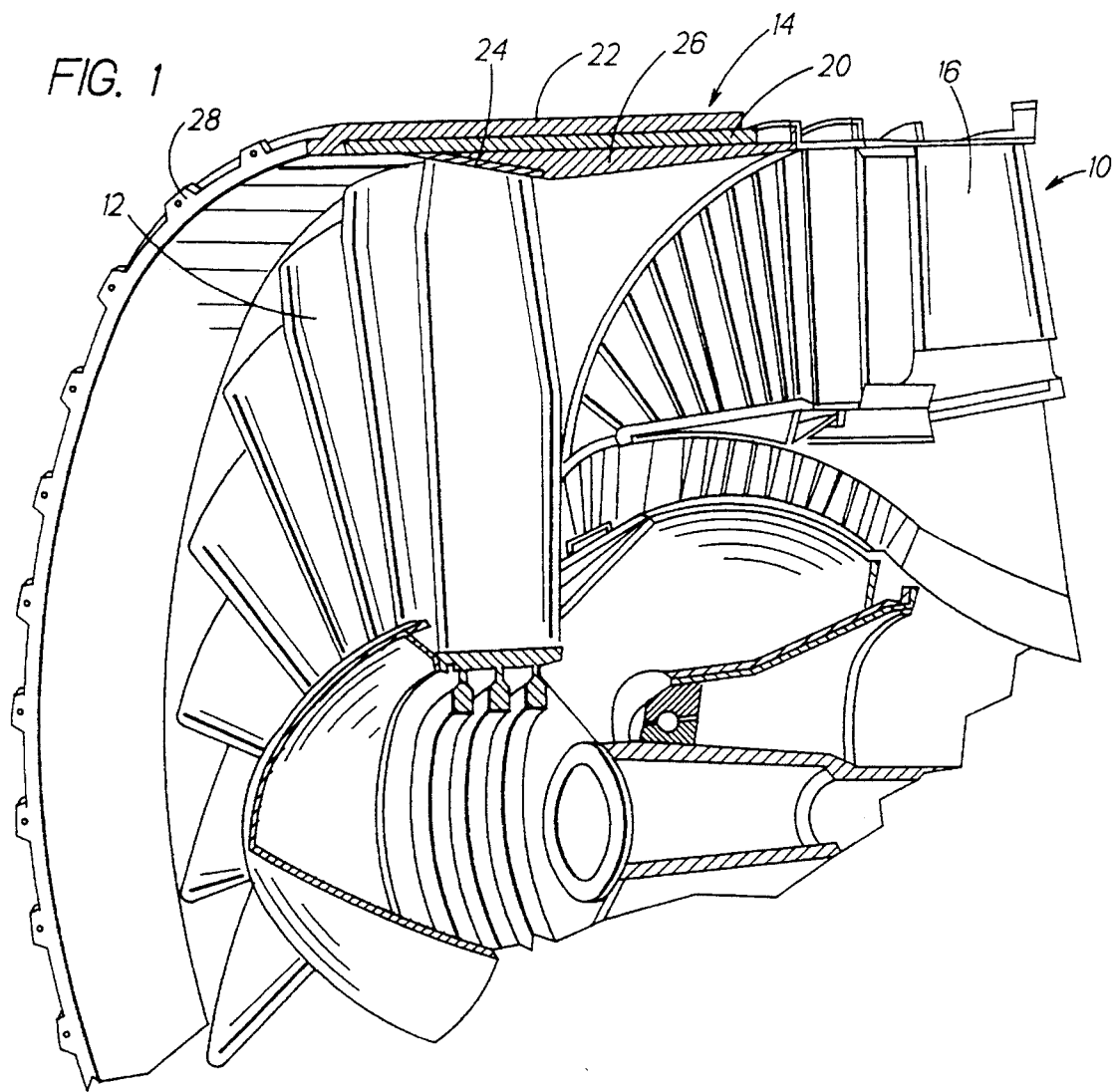
FIG. 1 is an isometric view of the gas turbine engine turbofan.

Referring to FIG. 1, the turbofan aircraft gas turbine engine 10 has a plurality of rotating fan blades 12 at the forward end. A case 14 of about 2.4 meters diameter surrounds these blades being supported by struts 16. The case has an isogrid structure 20 with aluminum metal sheet plate 18 bonded thereto. This is surrounded by multiple wraps of ballistic woven fabric 22 such as KEVLAR fabric. The casing also contains on a radially inside surface a wear strip 24 and a sound deadening honeycomb 26.

The casing has a flange 28 at the forward end for securing an inlet airflow cowl (not shown).

FIG. 2 is a section through casing 14 showing along with fan blade 12.

Throughout the major pan 30 of the length of the casing there is a large diameter 32 of 2.941 meters. Multiple layers of woven ballistic fabric 22 form the surrounding restraining structure, there being in the order of 140 wraps of the woven fabric. The reduced diameter neck portion 34 is located at the forward end of the case with a diameter 36 of 2.877 meters. The diameter and therefore the circumference of the major part is therefore 2.22% greater than the neck portion. A cuff portion 38 of the ballistic fabric is established in contact with the reduced diameter portion of the case.

In specifying the weave of the fabric to be applied, the portion which will be applied at the forward end is specified to have warp yarn 2.17% shorter than the warp yarn of the aft portion. This is accomplished by the manufacturer by weaving the fabric on a curved mandrel. Such fabric may be obtained from Fabric Development Inc. of Quakertown, Pa. Accordingly, the warp yarns are more than 2% shorter at the forward end with the fabric at equal strain. In other words, with no tension of the fabric these yarns are shorter, and remain shorter as tension increases to whatever level is used in application of the fabric to the casing.

During installation of the fabric on the casing, uniform tension is applied with the shaped mandrel. An epoxy resin is applied during the application of the fabric with this saturating the entire thickness of the multiple wraps of fabric throughout the cuff portion 38. The applied resin is cured.

The step 40 adjacent the cuff is produced by a circumferentially running flange 42 which has at its forward facing outer comer 44 a radius greater than 0.25 millimeters approximately 0.277 millimeters. This forms a sharp edge which is not likely to cut the fabric. An under cut 46 on this flange is supplied to reach the thickness required for strength, while saving weight. The broader surface in contact with the fabric spreads the fabric load, lowering the bearing stress.

We claim:

1. An aircraft fan containment system for a turbofan engine having a rotating plurality of fan blades comprising:

a cylindrical case surrounding said fan blades;

a large diameter containment portion of said case throughout the major part of the length of said case;

a reduced diameter neck restraint portion of said case at the forward end of said case;

a multiple layer winding of ballistic fabric surrounding both said containment portion and said restraint portion of said case;

said fabric having warped yarns extending circumferentially of said case; and said warped yarns in the portion of said winding surrounding said restraint portion being shorter than the warped yarns in the portion of said winding surrounding said containment portion at equal strain.

2. A containment system as in claim 1, further comprising:

at least a portion of the fabric of said neck portion saturated with cured epoxy resin throughout the circumference.

3. A containment system as in claim 1, further comprising:

a step between said large diameter portion and said reduced diameter portion of greater than two percent of said reduced diameter portion.

4. A containment system as in claim 3, further comprising:

said step produced by a circumferentially running flange having a forward facing outer corner of a radius greater than 0.25 millimeters.

5. A containment system as in claim 1, further comprising:

at least a portion of the fabric of said neck portion saturated through the entire thickness of said multiple layer winding with cured epoxy resin throughout the circumference.

6. A containment system as in claim 4, further comprising:

a step between said large diameter portion and said reduced diameter portion of greater than two percent of said reduced diameter portion.

7. A containment system as in claim 5, further comprising:

a step between said large diameter portion and said reduced diameter portion of greater than two percent of said reduced diameter portion.

8. A containment system as in claim 6, further comprising:

said step produced by a circumferentially running flange having a forward facing outer corner of a radius greater than 0.25 millimeters.

9. A containment system as in claim 7, further comprising:

said step produced by a circumferentially running flange having a forward facing outer corner of a radius greater than 0.25 millimeters.

* * * * *